(12) United States Patent
Zoryn et al.

(10) Patent No.: US 10,810,181 B2
(45) Date of Patent: *Oct. 20, 2020

(54) REFINING STRUCTURED DATA INDEXES

(71) Applicant: Microsoft Technology Licensing, LLC, Redmond, WA (US)

(72) Inventors: Kanstantsyn Zoryn, Redmond, WA (US); Zhimin Chen, Redmond, WA (US); Kaushik Chakrabarti, Redmond, WA (US); James P. Finnigan, Redmond, WA (US); Vivek R. Narasayya, Redmond, WA (US); Surajit Chaudhuri, Redmond, WA (US); Kris Ganjam, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,176

(22) Filed: Apr. 11, 2018

(65) Prior Publication Data

US 2018/0232410 A1 Aug. 16, 2018

Related U.S. Application Data

(63) Continuation of application No. 14/325,377, filed on Jul. 8, 2014, now Pat. No. 9,959,305.

(51) Int. Cl.
*G06F 16/22* (2019.01)
*G06F 16/951* (2019.01)
*G06F 16/958* (2019.01)
*G06F 16/955* (2019.01)
*G06F 16/2457* (2019.01)

(52) U.S. Cl.
CPC .... *G06F 16/2282* (2019.01); *G06F 16/24573* (2019.01); *G06F 16/951* (2019.01); *G06F 16/958* (2019.01); *G06F 16/9558* (2019.01)

(58) Field of Classification Search
None
See application file for complete search history.

(56) References Cited

U.S. PATENT DOCUMENTS

2002/0188621 A1* 12/2002 Flank ................. G06F 16/5846

OTHER PUBLICATIONS

Pimplikar et al., "Answering Table Queries on the Web using Column Keywords", Proceeding the VLDB Endowment, Volumn 5, No. 10, (Year: 2012).*

(Continued)

*Primary Examiner* — Amresh Singh
(74) *Attorney, Agent, or Firm* — Ray Quinney & Nebeker P.C.; James Bullough

(57) ABSTRACT

The present invention extends to methods, systems, and computer program products for refining structured data indexes. Aspects of the invention include associating structured data, such as, for example, tables, with additional content. Additional content can include content outside the <table> and </table> tags of a web table. Indexes for structured data (e.g., table indexes) can be refined based on the additional content to improve the relevance of providing parts of the structured data (e.g., parts of the table) in search results.

20 Claims, 9 Drawing Sheets

(56) References Cited

OTHER PUBLICATIONS

Yakout et al., "InfoGather: Entity Augmentation and Attribute Discovery", Holistic Matching with Web Tables, SIGMOD'12, ACM (Year: 2012).*

Weisstein, Eric W., Subset, Feb. 21, 2010, "http://mathworld.wolfram.com/Subset.html" (Year: 2010).*

* cited by examiner

REFINING STRUCTURED DATA INDEXES

CROSS-REFERENCE TO RELATED APPLICATIONS

This application is a continuation of and claims the benefit of and priority to U.S. patent application Ser. No. 14/325,377, entitled "Annotating Structured Data For Search", filed Jul. 8, 2014 by Kanstantsyn Zoryn et. al., the entire contents of which are expressly incorporated by reference.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Search engines can be used on networks, including the Internet, to locate information of interest to a user. A search engine typically uses a crawler that continual crawls Web pages on a network, such as, the Internet, to index content. To find content, a user submits one or more search terms to the search engine. The search engine identifies pages deemed to contain content relevant to the one or more search terms. The search engine then returns links to the identified pages back to the user. The user can then select (e.g., "click") a link to view content of a corresponding page.

A structured data search system (SDSS) similarly crawls a network, such as the Internet, to index structured information. Structured information can include tables in a relational database or HTML tables extracted from Web pages. To find structured data, a user submits one or more search terms to the SDSS. The SDSS identifies structured data, such as, a table, deemed to contain content relevant to the one or more search terms. The search engine then returns the structured data back to the user. The user can then integrate the structured data into their applications.

Due to the diversity of content generation on the Internet, the definition and content of structured data as well as the integration of structured data into a Web page can vary widely between different Web pages. Thus, it can be difficult to effectively index structured data, such as, tables. When structured data is not appropriately indexed, search results are less relevant.

BRIEF SUMMARY

The present invention extends to methods, systems, and computer program products for refining structured data indexes. Aspects of the invention include refining structured data indexes (e.g., table indexes) based on additional content to improve the relevance of providing parts of the structured data (e.g., parts of the table) in search results.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
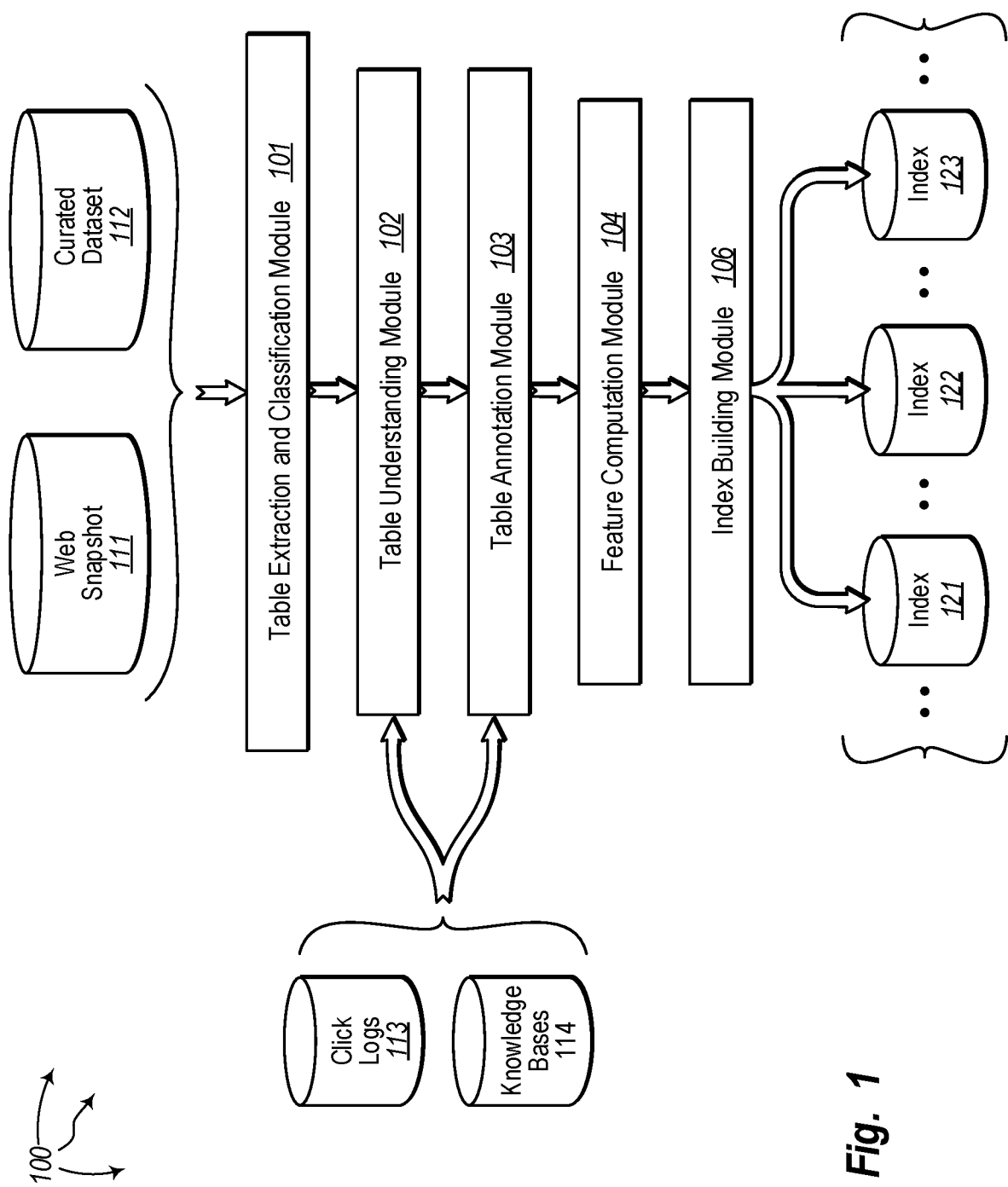
FIG. 1 illustrates an example computer architecture that facilitates building one or more indexes from one or more datasets of structured data.

The present invention extends to methods, systems, and computer program products for annotating structured data for search. Aspects of the invention include associating structured data, such as, for example, tables, with additional content to improve indexing of the structured data for search and/or provide improved search results for structured data.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In these description and the following claims, a "table" is defined as set of data elements (values) arranged in a two dimensional structure and having data along two axes. A table can include vertical columns and horizontal rows. When a table is rotated 90 degrees, columns can become rows and rows can be become columns.

Each intersection of a row and column represents a cell. Rows can be identified by the values appearing in a specified column subset, for example, identified as a key index. Tables can be found in databases, in web pages, in curated datasets, captured from images (e.g., whiteboards), found in other files (e.g., Portable Document Format ("PDF") files), or found in other sources, etc. Aspects of the invention can be used to understand tables from any of these sources.

One or more columns of a table can be subject columns. A subject column contains the names of entities the table is about. Other columns in a table represent relationships or attributes of entities in a subject column. A subject column can be viewed as an approximate key.

A row of a table can be a column header. A column header for a table contains names of the table's columns.

Aspects of the invention include associating structured data, such as, for example, tables, with additional content to improve indexing of the structured data for search and/or provide improved search results for structured data. Web pages can include tables as well as other content. The other content in a web page, such as, for example, content outside the <table> and </table> tags of a web table, can be useful in supporting searches for web tables. Content in one web page can also be useful in supporting searches for a table in another web page.

Index Build Architecture

FIG. 1 illustrates an example computer architecture 100 that facilitates building one or more indexes from one or more datasets of structured data. Referring to FIG. 1, computer architecture 100 includes table extraction and classification module 101, table understanding module 102, table annotation module 103, feature computation module 104, index building module 106, web snapshot 111, curated dataset 112, click logs 113, knowledge bases 114, and indexes 121, 122, and 123. Each of table extraction and classification module 101, table understanding module 102, table annotation module 103, feature computation module 104, index building module 106, web snapshot 111, curated dataset 112, click logs 113, and knowledge bases 114, and indexes 121, 122, and 123 can be connected to one another over (or be part of) a network, such as, for example, a Local Area Network ("LAN"), a Wide Area Network ("WAN"), and even the Internet. Accordingly, each of table extraction and classification module 101, table understanding module 102, table annotation module 103, feature computation module 104, index building module 106, web snapshot 111, curated dataset 112, click logs 113, and knowledge bases 114, and indexes 121, 122, and 123, as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

In general, computer architecture 100 can leverage web snapshot 111, and possibly also one or more curated datasets 112, to build one or more of indexes 121, 122, and 123. Computer architecture 100 can extract tables from web snapshot 111 and/or one or more curated datasets 112, understand and annotate the extracted tables, and build one or more of indexes 121, 122, and 123 based on the understanding/annotation of the tables. Indexes 121, 122, and 123 can then be used by an index serve component to retrieve candidate results to user queries as well as rank candidate result tables based on relevance. Each of indexes 121, 122, and 123 can be a different type of index, such as, for example, a string mapping index that maps tokens to identifiers and contains inverse document frequencies of the tokens, a keyword (inverted) or feature index that can be used to retrieve top ranked tables for user queries, or a table content index that can be used to generate previews/snippets for retrieved tables as well as fetch complete tables when requested.

Within computer architecture 100, table extraction and classification module 101 can receive web snapshot 111 and/or curated data set 112 as input. Web snapshot 111 can include tables in HyperText Markup Language (HTML) format. Curated dataset 112 can include tables in a site specific format, such as, for example, data from data.gov or the World Bank. Web snapshot 111 and curated dataset 112 can be created using wrappers and/or crawlers that scrape sites, understand the format of those sites, and extract tables. For example, Web snapshot 111 can be created from scraping the Internet. Thus, Web snapshot 111 can include web tables. The web tables can be relational or non-relational. Some tables may expressly define a subject column and column headers. Other tables may lack an express definition of a subject column and/or column headers.

Table extraction and classification module 101 can extract tables from web snapshot 111 and/or curated data set 112.

Table extraction and classification module 101 can filter out tables of no value, such as, for example, tables used for navigational/layout purposes. From any remaining tables, table extraction and classification module 101 can classify tables as relational and/or non-relational tables. In one aspect, table extraction and classification module 101 also filters out non-relational tables. Table extraction and classification module 101 can output tables (e.g., relational tables) for use by other modules in computer architecture 100.

Click logs 113 can include link selection information ("clicks") logged for a plurality of network users. For the Internet, click logs 113 can include link selection information for a larger plurality of users. Knowledgebases 114 can include different classes of knowledgebase. One class of knowledgebase can contain structured information about entities and/or relationships between entities, such as, for example, tables in web snapshot 111 and/or curated dataset 112. For example, a knowledge base can include information about table entities, including: entity names, entity types, entity attributes, and values for entity attributes. Another class of knowledgebase are those extracted from Web documents (e.g., using text patterns).

Table understanding module 102 can receive tables (e.g., relational tables) extracted by table extraction and classification module 101 as input. Table understanding module 102 can use various different table understanding algorithms to understand tables. Some tables may lack expressly defined subject columns and/or expressly defined column headers. As such, table understanding algorithms can be configured to identify subject columns for tables and/or detect column headers for tables when tables do not expressly define such information. Table understanding module 102 can utilize click logs 113 and knowledgebases 114 to assist with understanding tables. Table understanding module 102 can output identified subject columns and detected column headers for tables.

Table annotation module 103 can receive tables (e.g., relational tables) extracted by table extraction and classification module 101. Table annotation module 103 can also receive identified subject columns and detected column headers for tables (e.g., from table understanding module 102). Table annotation module 103 can use various different table annotation algorithms to annotate tables with relevant content that is not expressly defined as being associated with tables. For example, on a web page containing a table, content within <table> and </table> tags (e.g., cell values and column names) can be useful in supporting keyword and data finding searches.

However, there can also be additional content useful in supporting keyword and data finding searches that is not within <table> and </table> tags. For example, additional content can be on a web page outside <table> and </table> tags, additional content can be in other web pages containing links to the web page, additional content can be in click log data, etc. As such, table annotation algorithms can be configured to identify this additional content and annotate corresponding tables with the additional content. Subsequently, index building module 106 can generate inverted index over this additional content as well as content within <table> and </table> tags.

Table annotation module 103 can utilize click logs 113 and knowledge bases 114 to assist with identifying additional content and annotating corresponding tables with the additional content. Table annotation module 103 can output tables annotated with corresponding additional content.

Feature computation module 104 can receive tables. Feature computation module 104 can use various feature computation algorithms to compute (static) features of tables. The computed (static) features can be used for ranking. For example, feature computation module 104 can compute static (i.e., query independent) features of web tables for use in relevant ranking. Rankings can be used to help surface better (e.g., more reputed, more popular, or more relevant) web tables when many web tables satisfy a search query. Feature computation module 104 can output computed (static) features for tables.

Feature computation module 104 can be used with annotated or unannotated tables. When feature computation module 104 receives annotated tables, the various feature computation algorithms can use additional content contained in annotations to compute (static) features.

Index building module 106 can receive tables. Index building module 106 can use various index building algorithms to build one or more of indexes 121, 122, and 123 from received tables. Index building module 106 can receive annotated or unannotated tables. When index building module 106 receives annotated tables, the various index building algorithms can use additional content contained in annotations when building indexes. Index building module 106 can also access computed (static) features for tables. When index building module 106 accesses computed (static) features for tables, the various index building algorithms can use the computed (static) features when building indexes.

Associating Additional Content With Structured Data

Figure 2:
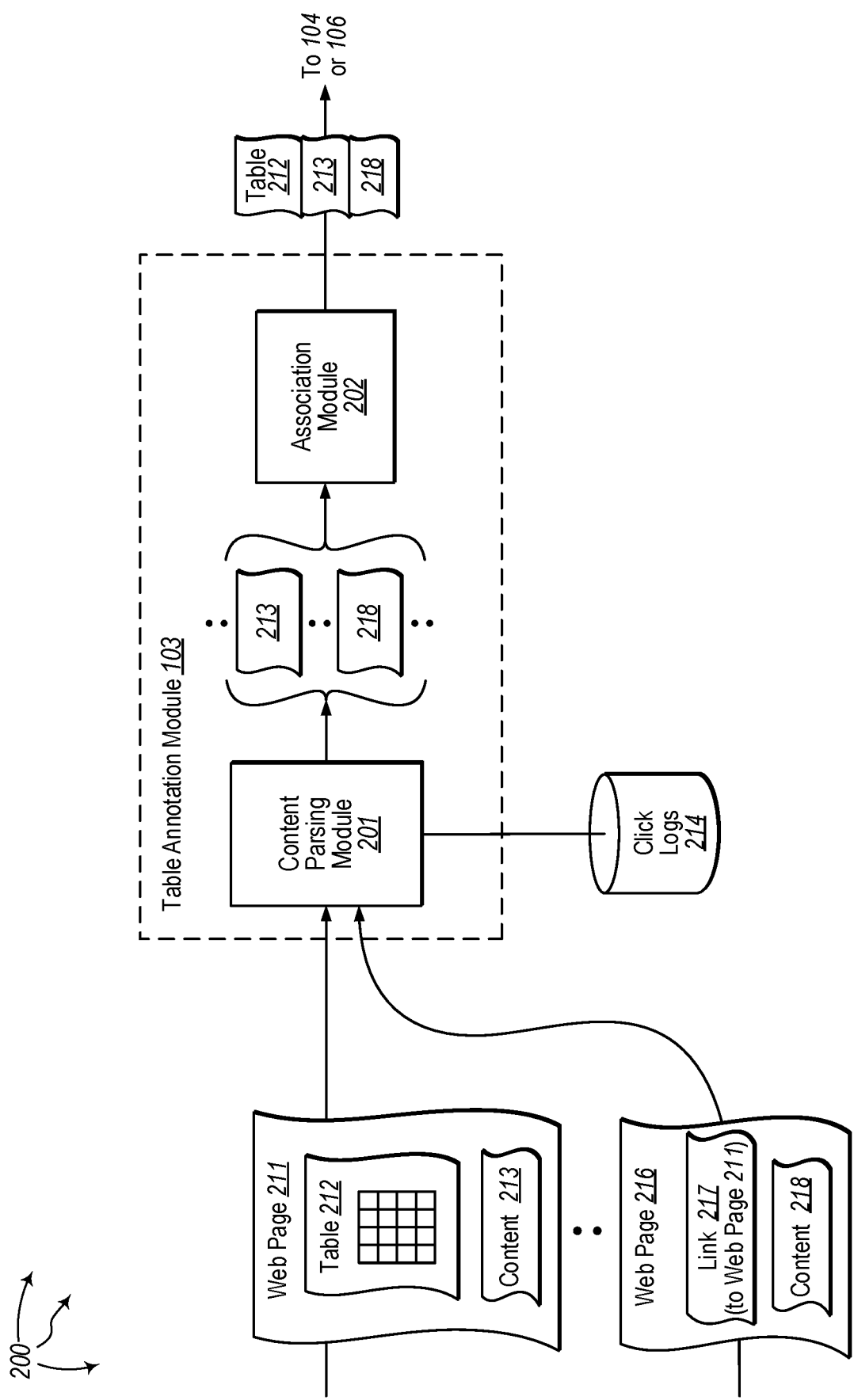
FIG. 2 illustrates an example computer architecture that facilitates associating additional content with structured data to improve indexing for search.

FIG. 2 illustrates an example computer architecture 200 that facilitates associating additional content with structured data (e.g., a table) to improve indexing for search. Referring to FIG. 2, computer architecture 200 includes content identification module 201 and association module 202. Each of content identification module 201 and association module 202 can be connected to one another over (or be part of) a network, such as, for example, a Local Area Network ("LAN"), a Wide Area Network ("WAN"), and even the Internet. Accordingly, each of parsing module 201 and association module 202 can be connected as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Content identification module 201 and association module 202 can be included in table annotation module 103. Alternatively, content identification module 201 and association module 202 can operate outside of table annotation module 103.

Content identification module 201 is configured to parse content from web pages and identify content relevant to supporting searches for tables. Content identification module 201 can parse and identify content in web pages that contain tables. A web page can contain table content within <table> and </table> tags. The web page can contain other content outside the <table> and </table> tags. Content identification module 201 can parse and identify the other content to support searches for tables. Content identification module 201 can also parse and identify content in web pages that link into other web pages containing tables. Content identification module 201 can also parse and identify content in query click logs. A variety of different types of content, including page titles, headings, Uniform Resource Locators (URLs), surrounding text, Document Object Model (DOM) trees, captions, etc. can be parsed and identified.

Association module 202 is configured to associate identified content with a table. As such, index generation module 106 can generate an inverted index over the table as well as the associated content.

Figure 3:
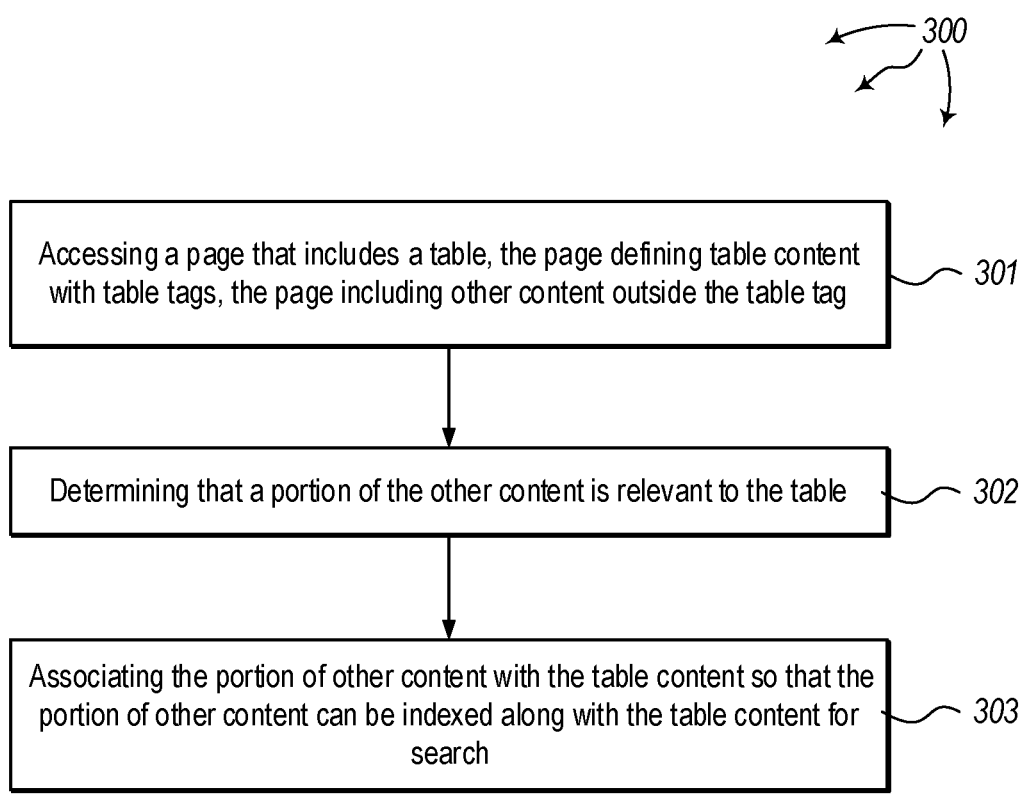
FIG. 3 illustrates a flow chart of an example method for associating additional content with structured data to improve indexing for search.

FIG. 3 illustrates a flow chart of an example method 300 for associating additional content with structured data to improve indexing for search. Method 300 will be described with respect to the components and data of computer architecture 300.

Method 300 includes accessing a page that includes a table, the page defining table content with table tags, the page including other content outside the table tags (301). For example, content identification module can access web page 211. As depicted, web page 211 includes table 212 and content 212. It may be that table 212 is a web table having content defined within <table> and </table> tags. Content 213 can be other content that is outside the <table> and </table> tags.

Method 300 includes determining that a portion of the other content is relevant to the table (302). For example, content identification module 201 can parse web page 211 and determine that content 213 is relevant to table 212.

In one aspect, content 213 contains a page title, a highest level heading (e.g., an h1 heading), and a Uniform Resource Location (URL) for web page 211. It may be that table 212 is the primary content of web page 211 (e.g., the table in the Wikipedia page "List of countries by population"). As such, the page title, the highest level heading, and Uniform Resource Locator (URL) of web page 211 can provide an appropriate description of the table 212. Even if not fully descriptive, table 212 can contain an aspect of the main topic of a web page 211. As such, content identification module 201 can determine that the page title, highest level heading, and URL of web page 211 are relevant to table 212.

Content 213 can also contain a variety of sub-headings used in web page 211 at various levels. Subheadings can be indicated by the tags hx, where x is a number between 2 and n (hn being the lowest level). In some implementations, n=6. The sequence of subheadings for the section containing the table can describe aspects of the topic represent by the table. As such, content identification module 201 can determine that a sequence of sub-headings in content 213 is relevant to table 212.

Figure 8:
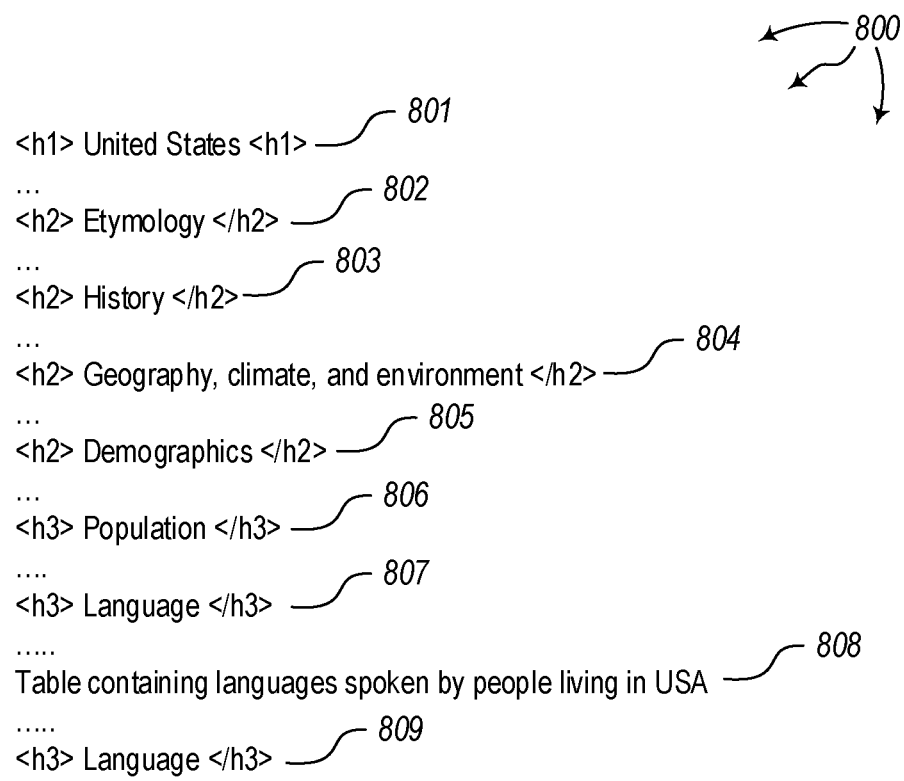
FIG. 8 depicts an example heading structure.

Turning to FIG. 8, FIG. 8 depicts an example heading structure 800. Line 601 indicates an h1 heading is "United States". Lines 802, 803, 804, and 805 indicate lower level h2 headings of "Etymology", "History", "Geography, climate, and environment", and "Demographics" respectively contained within h1. Lines 806 and 807 and 809 indicate lower level h3 headings of "Population" and "Language" respectively contained within h2 "Demographics". Line 808 indicates a table containing languages spoken by people living in the USA is contained within h3 "Language".

Within heading structure 800, "Demographics" is the nearest h2 heading and "Language" is the nearest h3 heading for the table indicated at line 808. The table has no nearest h4 heading, nearest h5 heading, or nearest h6 heading. The sequence of nearest headings, i.e., United States →Demographics →Language appropriately describes the content of the table. As such, this sequence of nearest headings can be identified as relevant to the table indicated at line 808. Associating the sequence of nearest headings can be useful for keyword search. For example, if a user poses the query 'united states demographics language' or 'united states language', the table indicated at 808 can be returned.

Content 213 can also contain text. The text can surround table 212. Text preceding a table can describe the table. As such, content identification module 201 can determine that surrounding text in content 213 is relevant to table 212. For example, with continued reference to FIG. 8, there may be textual description of the table indicated at line 808 within the h3 heading "Language". The text within the h3 heading "Language" can be extracted as bring relevant to the table indicated at line 608.

Different algorithms can be used to identify surrounding text. One algorithm using preceding siblings in a Document Object Model (DOM) tree. The algorithm starts at a node in a DOM tree that corresponds to a table. The algorithm hops to a previous sibling. The algorithm locates descendants of the previous sibling that are terminal (i.e., no child nodes) and have an htmlNodeType of text. Text content at those nodes can be identified as relevant to the table. The algorithm can hop to n nodes. In some implementations, n=5. The algorithm can stop anytime another table node is encountered (and thus description of the wrong table could be extracted).

Another algorithm uses the nearest headings associated with the table as described. The algorithm can identify multiple surrounding texts, corresponding to the different nearest headings. The text immediately following each of the non-empty nearest heading associated with the table can be identified. More specifically, if the nearest h2 heading of the table is not empty, we extract the text between the h1 heading and first h2 heading of the page. If the nearest h2 heading is empty, the table may be contained in the section directly under the h1 heading. In this case, the text between the h1 heading and the table is identified. If there are other tables or lists between the h1 heading and table, the text between this table and the immediately preceding table/list is identified. The text can be referred to as h1 surrounding text.

Similarly, hx surrounding text can be identified where x is between 2 and n (e.g., 6). To extract hx surrounding text: if nearest hy heading is not empty (where y=x+1), we extract the text between the nearest hx heading and the first hy heading under it. If nearest by heading is empty, we extract the text between nearest hx heading and the table if there is no other table/list between them, otherwise the extract between this table and the immediately preceding table/list.

Content 213 can also contain a caption for table 212. A caption is useful for ranking table 212 as well as to generate a good snippet for table 212. As such, content identification module 201 can determine that a caption in content 213 is relevant to table 212. The caption can occur outside of <caption> </caption> tags. For example, a caption can occur in spanning headers of table 212. That is, a row within <thead> or <th> tags with colspan equal to the number of columns in the table. A caption for table 212 can also occur in surrounding text. A caption for table 212 can also occur in a row of a parent table, such as, for example, another table in web page 211. For example, a caption for multiple tables can appear in a first <tr></tr> row in a parent table. The actual tables can appear in a second <tr></tr> row of the parent table. In some implementations, a table and its header appear in the same cell of a parent table (and may occur even if there are no nested tables). When detected, and when there is a table in NavContent, the header from NavHead can be extracted.

In alternate implementations, a caption is specified using <caption> </caption> tags. As such, content identification module 201 can determine that a caption specified using <caption> </caption> tags is relevant to table 212.

In some aspects, another web page that links into web page 211 can contain content relevant to table 212. For example, web page 216 includes link 217 (e.g., a hyperlink) to web page 211. Thus, it may be that content in web page 216, such as, for example, content 218, is relevant to table 212. Content identification module 201 can access web page 216. As such, content identification module 201 can determine that content 218 (which may include one or more of any of the described types of content) is relevant to table 212.

In some aspects, click logs 214 can contain content relevant to table 212. Content identifications module 201 can access click logs 214. As such, content identification module 201 can determine that content contained in click logs 214 is relevant to table 212.

Accordingly, as depicted in FIG. 2, content identification module 201 identifies content 213 and 216 (which may include one or more of any of the described types of content) as relevant to table 212. Content identification module 201 sends content 213 and 216 to association module 202. Association module 202 receives content 213 and 216 from content identification module 201. Association module 202 can also access table 212.

Method 300 includes associating the portion of other content with the table content so that the portion of other content can be indexed along with the table content for search (303). For example, association module 202 can annotate table 212 with content 213 and 218. For example, table 212 can be annotated with a title, highest level heading, and URL of web page 211. When appropriate, table 212 can also be annotated with nearest headings, surrounding text, captions, etc.

Association module 202 can output table 212 annotated with content 213 and 218 to feature computation module 104 and/or index building module 106. When indexing, index building module 106 can generate an inverted index over content 213 and 218 as well as table 212 (i.e., content within <table></table> tags). Indexing content 213 and 218 can improve the relevance of table 212 when provided in search results.

Associating A Portion Of Text To A Table

Figure 4:
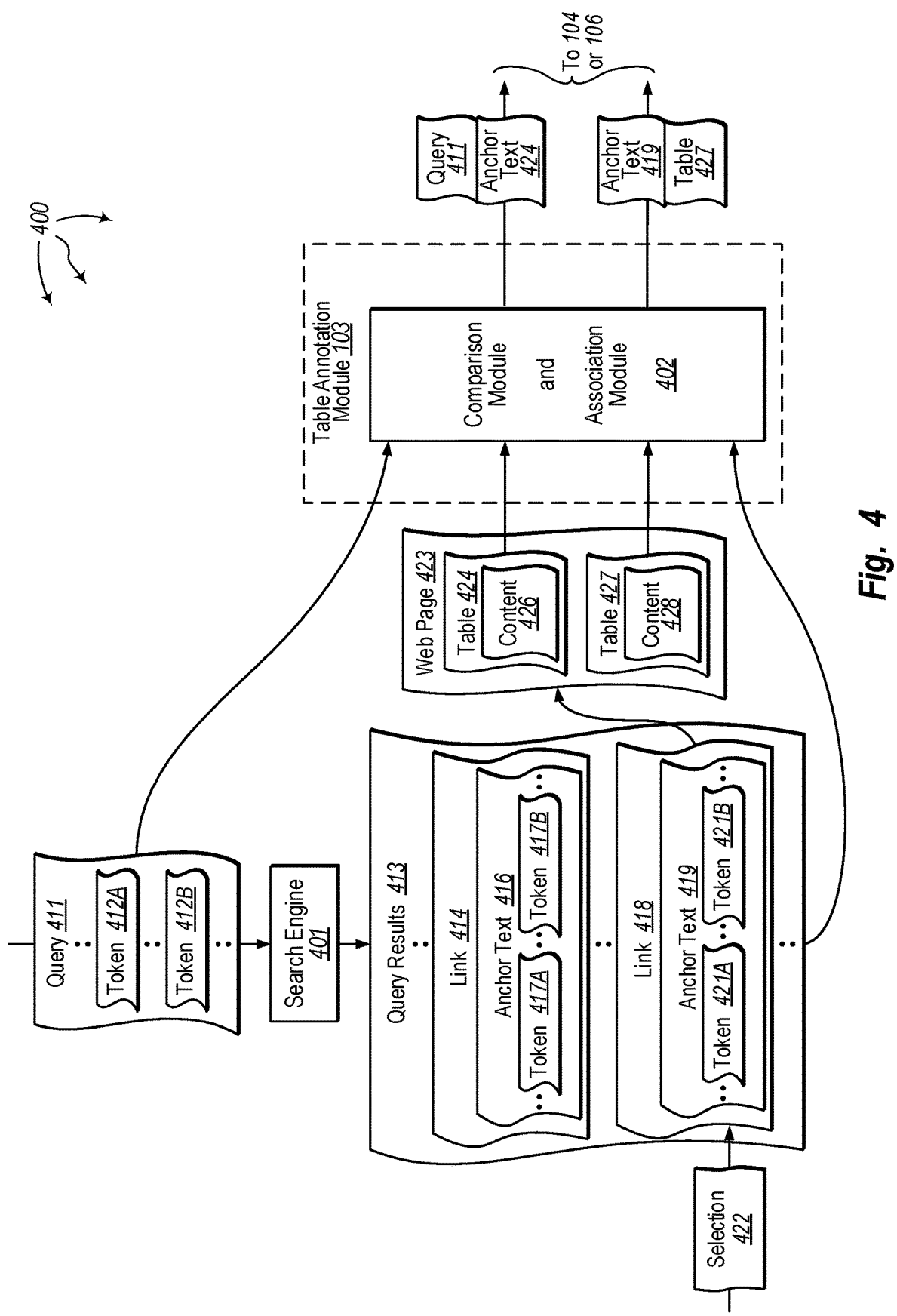
FIG. 4 illustrates example computer architecture that facilitates associating a portion of text to one or more tables in a web page to improve indexing for search.

FIG. 4 illustrates example computer architecture that facilitates associating a portion of text to one or more tables in a web page to improve indexing for search. Referring to FIG. 4, computer architecture 400 includes search engine 401 and comparison module and association module 402. Each of search engine 401 and comparison and association module 402 can be connected to one another over (or be part of) a network, such as, for example, a Local Area Network ("LAN"), a Wide Area Network ("WAN"), and even the Internet. Accordingly, each of search engine 401 and comparison and association module 402 can be connected as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Comparison and association module 402 can be included in table annotation module 103. Alternatively, comparison and association module 402 can operate outside of table annotation module 103.

A table can be associated with text from a variety of different locations, including search queries and incoming anchor text.

Comparison and association module 402 is configured to receive one or more tables contained in a web page along with text used to locate and/or access the web page. Comparison and association module 402 can compare portions of the text (e.g., tokens, such as, words, etc.) to table content to determine if a table contains any or all of the text portions. In some aspects, a table that contains all of the portions of text used to locate and/or access a web page containing the table is identified for association with the text. For example, when the contents of a table contain all the words in a search query, the search query can be identified for association with the table. Similarly, when the contents of a table contain all the words in incoming anchor text, the incoming anchor text can be identified for association with the table.

Comparison and association module 402 is also configured to associate text with tables. When text is identified for association with a table, comparison and association module 402 can annotate the text to the table. For example, comparison and association module 402 can annotate an identified search query or identified incoming anchor text to a table.

A user can submit query 411 to search engine 401. As depicted, query 411 includes tokens 412A, 412B, etc. (e.g., one or more words or other portions of text). Search engine 401 can generate query results 413, including links 414, 418, etc. (e.g., hyperlinks) Search engine 401 can determine that web pages linked to by each of links 414, 418, etc. are an appropriate match to query 411. The same or a different user can enter selection 422 (e.g., a mouse click) to select link 418. Selecting link 418 can be used to access Web page 423. As depicted, web page 423 includes table 424 containing content 426 and table 427 containing content 428.

Figure 5:
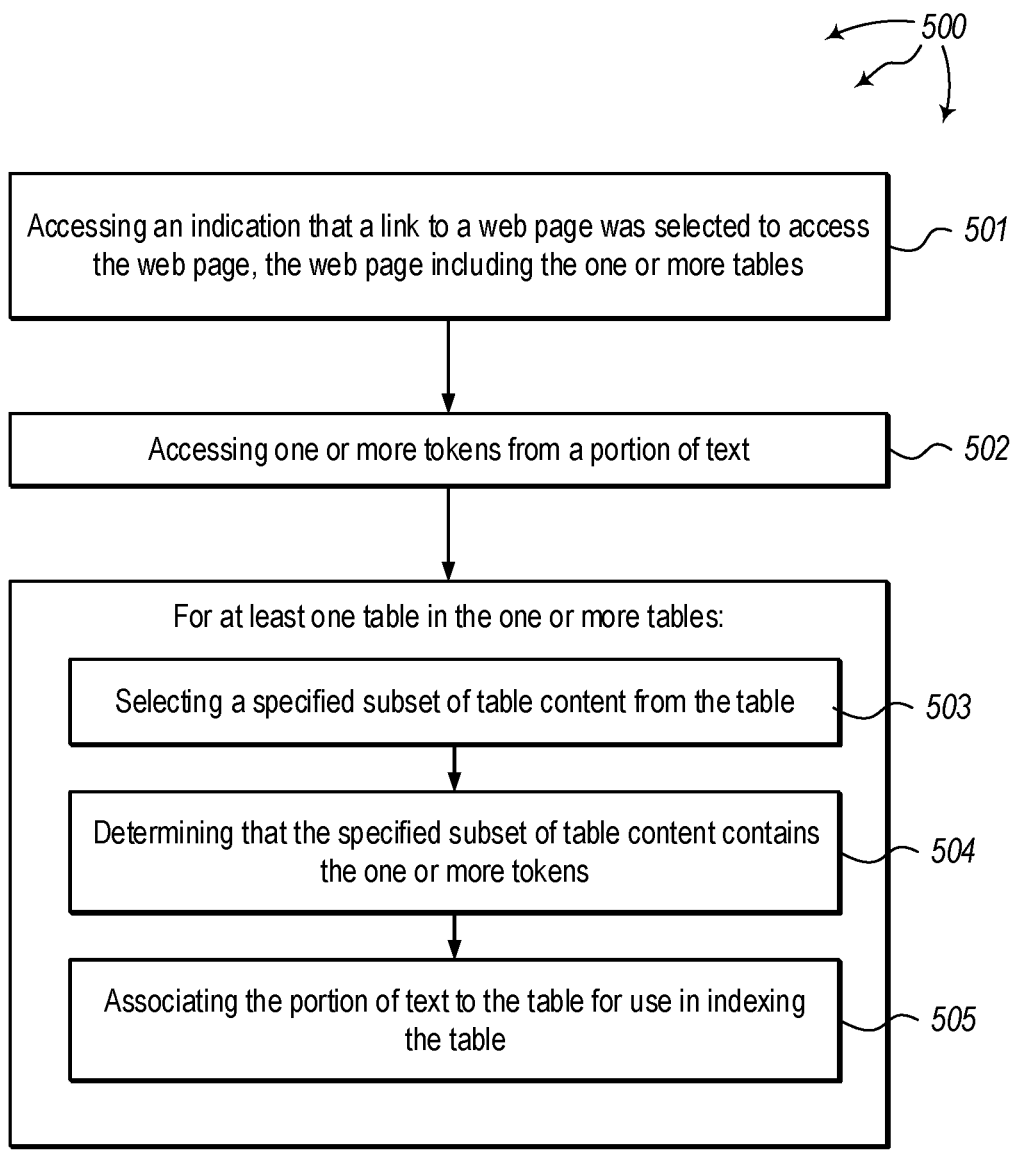
FIG. 5 illustrates a flow chart of an example method for associating a portion of text to one or more tables in a web page to improve indexing for search.

FIG. 5 illustrates a flow chart of an example method 500 for associating a portion of text to one or more tables in a web page to improve indexing for search. Method 500 will be described with respect to the components and data in computer architecture 400.

Method 500 includes accessing an indication that a link to the web page was selected to access the web page, the web page including the one or more tables (501). For example, comparison module 402 can receive an indication that link 418 was selected to access web page 423. As depicted, web page 423 includes tables 424 and 427.

Method 500 includes accessing one or more tokens from a portion of text (502). For example, comparison and association module 402 can access tokens 412A, 412B, etc. from access query 411. Alternately and/or in combination, comparison module 402 can access tokens 421A, 421B, etc., from anchor text 419.

Comparison module 402 can also access web page 423.

Method 500 includes, for at least one table in the one or more tables, selecting a specified subset of table content from the table (503). For example, comparison and association module 402 can select content 426 from table 424. Alternately and/or in combination, comparison module 402 can select content 428 from table 427.

Method 500 includes, for at least one table in the one or more tables, determining that the specified subset of table content contains the one or more tokens (504). For example, comparison and association module 402 can determine that content 426 contains each of tokens 412A, 412B, etc. from query 411. In another aspect, comparison and association module 402 can determine that content 428 contains each of tokens 421A, 421B, etc. from anchor text 419. When determining if a table contains tokens, different portions of table content, including: pagetitle, pageheading, urltokens, nearest headings, captions, column names, and header rows can be considered.

Method 500 includes associating the portion of text to the table for use in indexing the table (505). For example, comparison and association module 402 can annotate query 411 to table 424. Similarly, comparison and association module 402 can annotate incoming anchor text 419 to table 427.

In one aspect, when no table is determined to match the one or more tokens of a text portion, comparison and association module 402 can annotate each of tables in a web page with the text portion.

Comparison and association module 402 can output table 424 annotated with query 411 and/or table 427 annotated with anchor text 419 to feature computation module 104 and/or index building module 106. As appropriate, when indexing, index building module 106 can generate an inverted index over query 411 as well as table 424 and/or anchor text 419 as well as table 427. Indexing query 411 and/or anchor text 419 can improve the relevance of table 412 and/or table 427 respectively when provided in search results.

Associating Content With a Web Table

Figure 6:
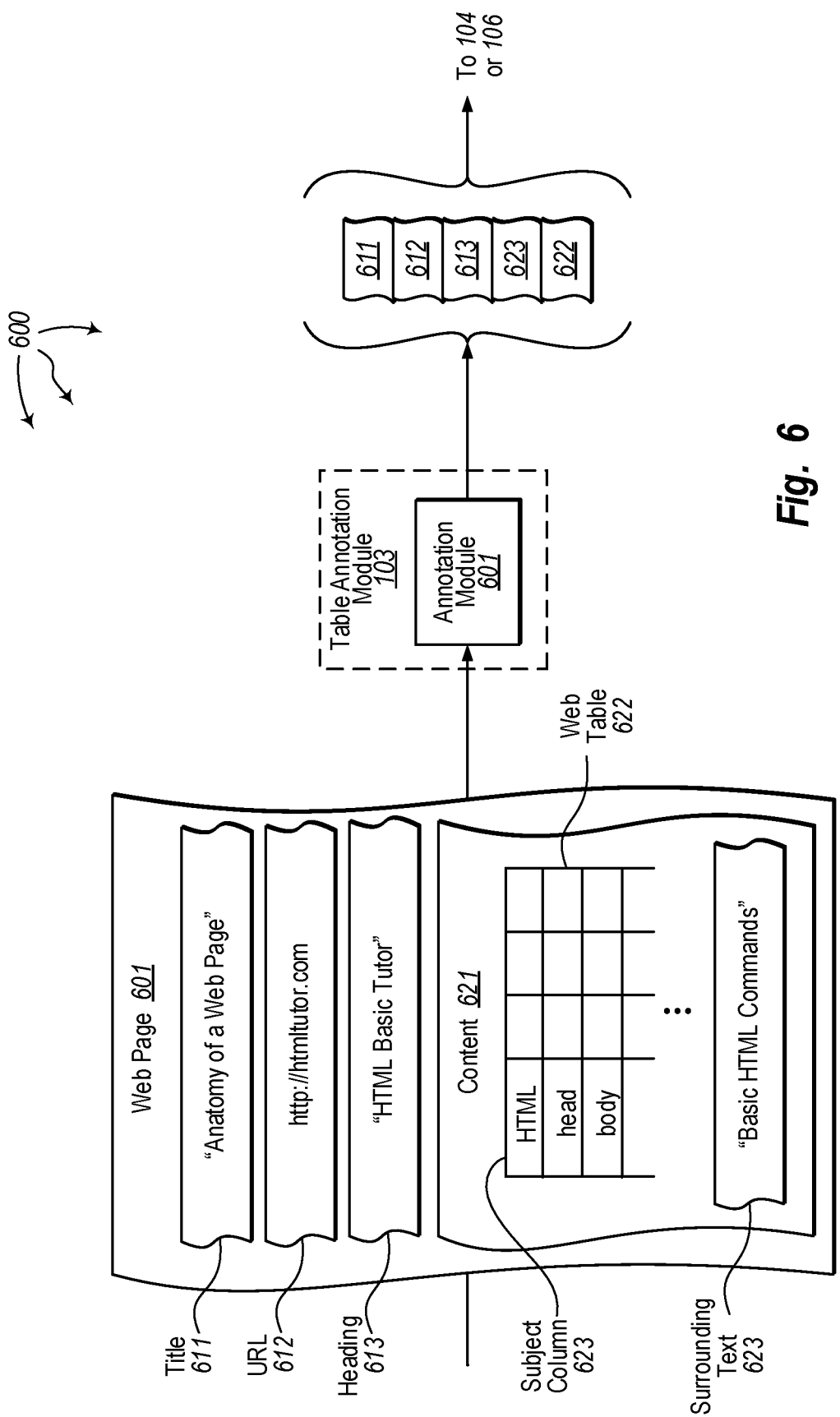
FIG. 6 illustrates an example computer architecture that facilitates associating additional content with a web table to improve indexing for search.

FIG. 6 illustrates an example computer architecture 600 that facilitates associating additional content with a web table to improve indexing for search. Referring to FIG. 6, computer architecture 600 includes annotation module 601. Annotation module 601 can be connected to (or be part of) a network, such as, for example, a Local Area Network ("LAN"), a Wide Area Network ("WAN"), and even the Internet. Accordingly, annotation module 601 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Annotation module 601 can be included in table annotation module 103. Alternatively, annotation module 601 can operate outside of table annotation module 103.

As depicted, web page 601 includes title 611 ("Anatomy of A Web Page"), URL 612 ("http://htmltutor.com"), heading 613 ("HTML Basic Tutor"), and content 621. Content 621 further includes web table 622 (e.g., defined by <table> and </table> and surrounding text 623 ("Basic HTML Commands"). Web table 622 can contain information about basic HTML commands. Each row of subject column 623 can indicate an HTML command. Other columns in each row can indicate further attributes of the HTML command in subject column 623.

Annotation module 601 can access web page 601. Using any of the described algorithms, annotation module 601 can determine that one or more of title 611, URL 612, heading 613, and surrounding text 623 are to be associated with web table 622. In one aspect, surrounding text 623 is a caption. Annotation module 601 can also use algorithms to determine that sub-headers (e.g., a sub-header sequence) and/or captions are associated with web table 622 when sub-headers and/or captions are found in other parts of content 621. Annotation module 601 can annotate web table 622 with one or more of title 611, URL 612, heading 613, and surrounding text 623. When appropriate, annotation module 601 can also annotate web table 622 with sub-headers (e.g., a sub-header sequence) and/or captions found in content 621.

Annotation module 601 can output web table 622 annotated with one or more of title 611, URL 612, heading 613, and surrounding text 623 to feature computation module 104 and/or index building module 106. When indexing, index building module 106 can generate an inverted index over the one or more of title 611, URL 612, heading 613, and surrounding text 623 as well as web table 622 (i.e., content within <table></table> tags). Indexing any of title 611, URL 612, heading 613, and surrounding text 623 can improve the relevance of web table 622 when provided in search results.

Associating Search Query Text With A Web Table

Figure 7A:
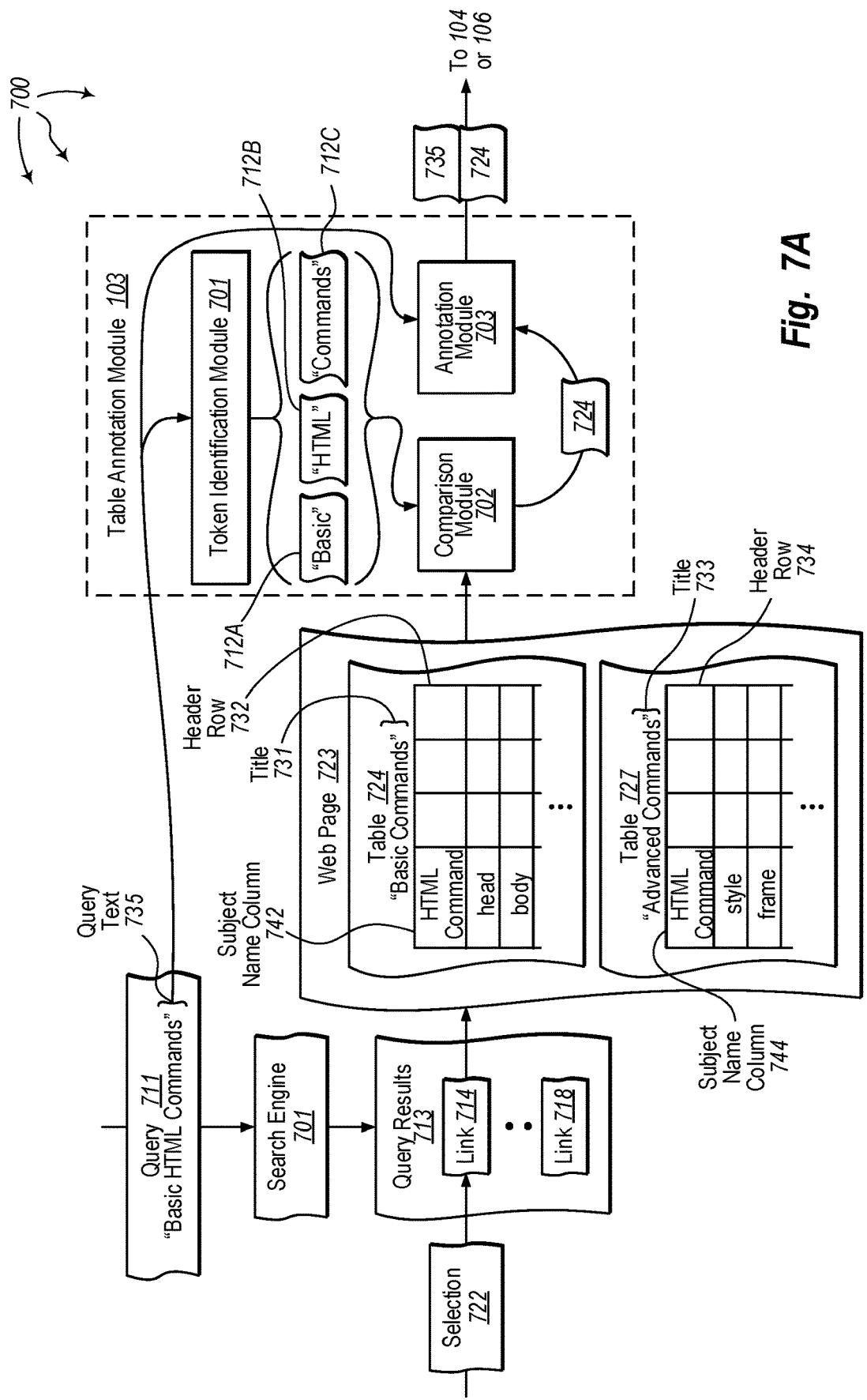
FIG. 7A illustrates example computer architecture that facilitates associating search query text to a web table to improve indexing for search.

FIG. 7A illustrates example computer architecture 700 that facilitates associating a search query text to a web table to improve indexing for search. Referring to FIG. 7A, computer architecture 700 includes token identification module 701, comparison module 702, and annotation module 703. Each of token identification module 701, comparison module 702, and annotation module 703 can be connected to (or be part of) a network, such as, for example, a Local Area Network ("LAN"), a Wide Area Network ("WAN"), and even the Internet. Accordingly, token identification module 701, comparison module 702, and annotation module 703 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Token identification module 701, comparison module 702, and annotation module 703 can be included in table annotation module 103. Alternatively, token identification module 701, comparison module 702, and annotation module 703 can operate outside of table annotation module 103.

Generally, token identification module 701 is configured to receive query text and derive one or more tokens form the query text. Comparison module 702 is configured to receive a table and one or more derived query tokens and determine if the table contains the one or more derived query tokens. When a table contains one or more derived query tokens, the table can be sent to annotation module 703. Annotation module 703 is configured to receive query text and an indication of one or more tables that contain one or more derived query tokens derived from the query text. Annotation module 703 can annotate the one or more tables with the query text.

A user can submit query 711 to search engine 701. As depicted, query 711 includes query text 735 ("Basic HTML Commands"). From the query text, search engine 701 can produce query results 713. Query results 713 include links 714, 718, etc. Each of links 714, 718, etc. can be a link to a page that search engine 701 has determined to be relevant to query text 735. The user can enter selection 722 to select link 714. In response to selecting link 714, web page 723 can be accessed (and presented to the user).

Web page 723 can contain a programmer's guide of information and attributes for HTML commands. Web page 723 includes web tables 724 and 727. Web table 724 can contain information about more basic HTML commands. Each row of subject column 741 ("HTML command") can indicate an HTML command. Other columns in each row can indicate further attributes of the HTML command in subject column 741. Header row 732 can define the names for other columns. Web table 724 has title 731 ("Basic Commands").

Web table 727 can contain information about more advanced HTML commands. Each row of subject column 744 ("HTML command") can indicate an HTML command. Other columns in each row can indicate further attributes of the HTML command in subject column 744. Header row 734 can define the names for other columns. Web table 727 has title 733 ("Advanced Commands").

Token identification module 701 can access query text 735. Token identification module 701 can derive tokens 712A ("Basic"), 712B ("HTML"), and 712C ("Commands") from query text 735. Token identification module 701 can send tokens 712A, 712B, and 712C to comparison module 702. Comparison module 702 can receive tokens 712A, 712B, and 712C from token identification module 701. Comparison module 702 can also access web page 723.

Comparison module 702 can compare tokens 712A, 712B, and 712C to web tables 724 and 727 to determine if either of web table 724 or table 727 contains each of tokens 712A, 712B, and 712C. With respect to web table 724, title 731 contains tokens 712A and 712C and subject column name 742 and/or row header 732 contains token 712B. As such, web table 724 does contain each of tokens 712A, 712B, and 712C. With respect to web table 727, title 733 contains token 712C and subject column name 744 and/or row header 734 contains token 712B. However, web table 727 does not contain token 712A.

Since web table 724 contains each of tokens 712A, 712B, and 712C, comparison module 702 can send web table 724 to annotation module 703. On the other hand, since web table 727 does not contain token 712A, web table 727 is not sent to annotation module 703.

Annotation module 703 can receive web table 724 from comparison module 702. Annotation module 703 can also access query text 735. Annotation module 703 can annotate table 724 with query text 735.

Annotation module 703 can output web table 724 annotated with query text 735 to feature computation module 104 and/or index building module 106. When indexing, index building module 106 can generate an inverted index over query text 735 as well as table 724 (i.e., content within <table></table> tags). Indexing of query text 735 can improve the relevance of web table 724 when provided in search results.

Associating Incoming Anchor Text With A Web Table

Figure 7B:
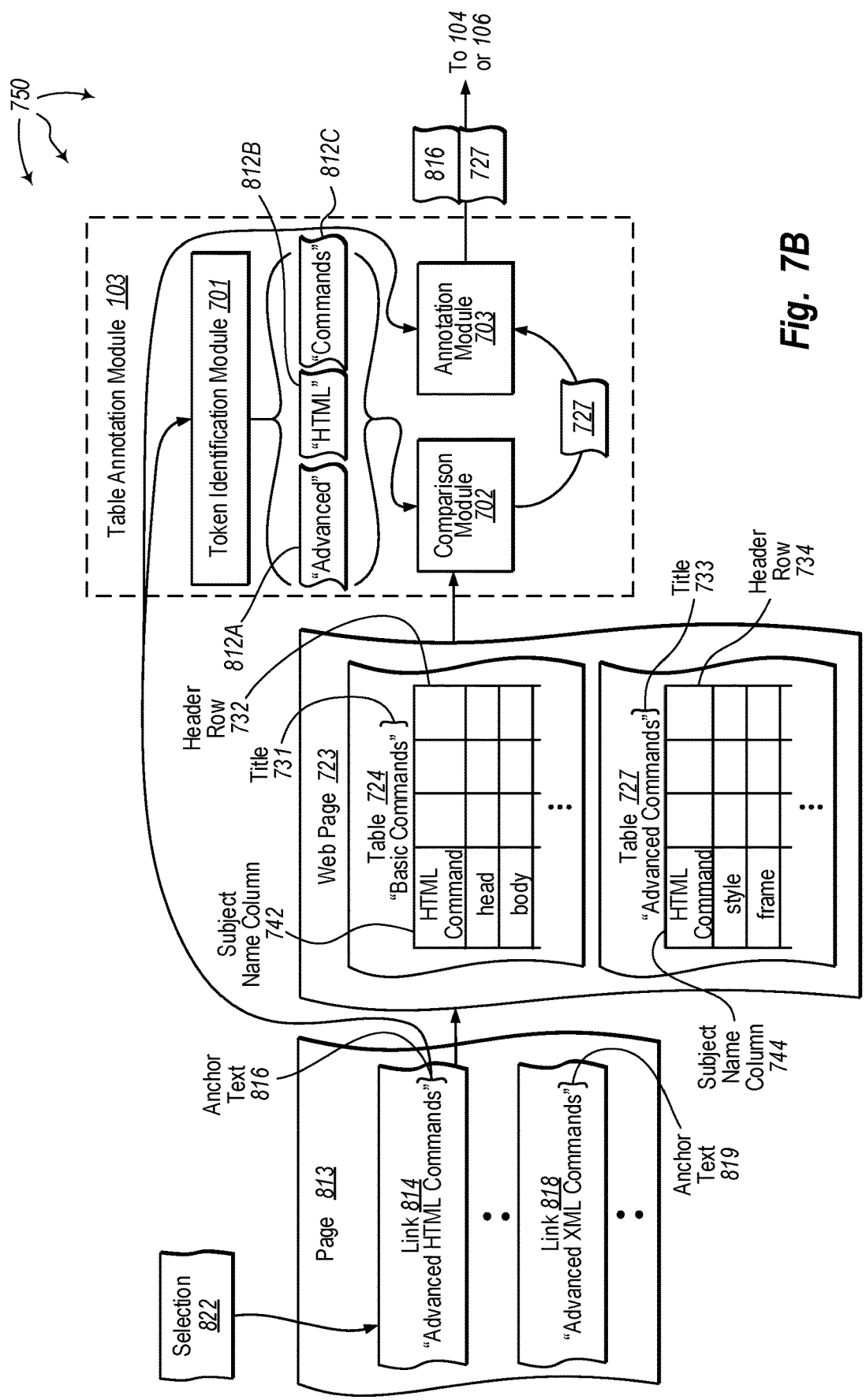
FIG. 7B illustrates example computer architecture that facilitates associating incoming anchor text to a web table to improve indexing for search.

FIG. 7B illustrates example computer architecture 750 that facilitates associating incoming anchor text to a web table to improve indexing for search.

As depicted, page 813 can be presented to a user. Page 813 includes links 814, 818, etc. Links 814 and 818 include anchor text 816 ("Advanced HTML Commands") and anchor text 819 ("Advanced XML Commands") respectively. Each of links 814, 818, etc. can be a link to another page. A user can enter selection 822 to select link 814. In response to selecting link 814, web page 723 can be accessed (and presented to the user).

Web page 723 can be a web page containing HTML commands. Web page 723 includes web tables 724 and 727. Web table 724 can contain information about more basic HTML commands. Each row of subject column 741 ("HTML command") can indicate an HTML command. Other columns in each row can indicate further attributes of the HTML command in subject column 741. Header row 732 can define the names for other columns. Web table 724 has title 731 ("Basic Commands").

Web table 727 can contain information about more advanced HTML commands. Each row of subject column 744 ("HTML command") can indicate an HTML command. Other columns in each row can indicate further attributes of the HTML command in subject column 744. Header row 734 can define the names for other columns. Web table 727 has title 733 ("Advanced Commands").

Token identification module 701 can access query text 735. Token identification module 701 can derive tokens 812A ("Advanced"), 812B ("HTML"), and 812C ("Commands") from anchor text 816. Token identification module 701 can send tokens 812A, 812B, and 812C to comparison module 702. Comparison module 702 can receive tokens 812A, 812B, and 812C from token identification module 701. Comparison module 702 can also access web page 723.

Comparison module 702 can compare tokens 812A, 812B, and 812C to web tables 724 and 727 to determine if either of web table 724 or table 727 contains each of tokens 812A, 812B, and 812C. With respect to web table 727, title 733 contains tokens 812A and 712C and subject column name 744 and/or row header 734 contains token 812B. As such, web table 727 does contain each of tokens 812A, 812B, and 812C. With respect to web table 724, title 731 contains token 812C and subject column name 742 and/or row header 732 contains token 812B. However, web table 724 does not contain token 812A.

Since web table 727 contains each of tokens 812A, 812B, and 812C, comparison module 702 can send web table 727 to annotation module 703. On the other hand, since web table 724 does not contain token 812A, web table 724 is not sent to annotation module 703.

Annotation module 703 can receive web table 727 from comparison module 702. Annotation module 703 can also access anchor text 816. Annotation module 703 can annotate table 727 with anchor text 816.

Annotation module 703 can output web table 727 annotated with anchor text 816 to feature computation module 104 and/or index building module 106. When indexing, index building module 106 can generate an inverted index over anchor text 816 as well as table 727 (i.e., content within <table></table> tags). Indexing of anchor text 816 can improve the relevance of web table 727 when provided in search results.

Implementations of the invention can be used in structured data search system (SDSS) that indexes structured information such as tables in a relational database or html tables extracted from web pages and allows users to search over the structured information (tables). The SDSS can index and provide multiple search mechanisms over structured information. One search mechanism is keyword search where the user poses a keyword query such as 'african countries gdp' to the SDSS. The SDSS returns a ranked list of tables which appropriately satisfies the information need of user. Another mechanism is data finding data where the user specifies a set of entities (e.g., present in a spreadsheet) and optionally additional keywords to the SDSS. The SDSS returns tables that contain the requested information for that set of entities.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A system comprising:
 a processor; and
 system memory coupled to the processor and storing instructions configured to cause the processor to:
  store an index improving relevance of providing one or more subsets of a table in search results;
  access an indication that a link to a previously indexed web page was selected by a user from among a plurality of links returned in query results responsive to a search query;
  access one or more tokens from at least one of the search query or anchor text in the link; and
  based on the one or more tokens and the indication that the link was selected, refine the index, wherein refining the index comprises:
   selecting a first subset of table content of the table from a plurality of different subsets of table content of the table;
   determining that the one or more tokens are relevant to describing the first subset of table content; and
   generating a refined index over the one or more tokens and the first subset of table content in the system memory by modifying the index to include an association between the one or more tokens and the first subset of table content; and
  store the refined index further improving the relevance of providing the one or more subsets of the table in the search results.

2. The system of claim 1, further comprising instructions configured to cause the processor to generate the refined index over one or more of:
 content external to the table;
 a portion of anchor text; or
 a portion of content in a knowledge base.

3. The system of claim 1, wherein the instructions configured to cause the processor to access the one or more tokens are further configured to cause the processor to access one or more words in a query.

4. The system of claim 1, wherein the instructions configured to cause the processor to refine the index comprises the instructions configured to cause the processor to generate a refined web table index.

5. The system of claim 1, wherein generating the refined index further comprises annotating the one or more tokens of the search query or anchor text to the first subset of table content.

6. The system of claim 1, wherein the one or more tokens includes a plurality of tokens from the at least one of a search query or anchor text in the link, and wherein determining that the one or more tokens are relevant to describing the first subset of table content is based on a determination that the first subset of table content includes each token from the plurality of tokens from the at least one of a search query or anchor text in the link.

7. The system of claim 1, wherein accessing the indication that the link to the previously indexed web page was selected by the user comprises accessing a click log including link selection information for a plurality of users.

8. The system of claim 1, wherein accessing the indication that the link to the previously indexed web page was selected by the user comprises receiving, at the system, an indication that the link was selected by the user.

9. A method comprising:
 storing an index improving relevance of providing one or more subsets of a table in search results;
 accessing an indication that a link to a previously indexed web page was selected by a user from among a plurality of links returned in query results responsive to a search query;
 accessing one or more tokens from at least one of the search query or anchor text in the link; and based on the one or more tokens and the indication that the link was selected, refining the index, wherein refining the index comprises:
  selecting a first subset of table content of the table from a plurality of different subsets of table content of the table;
  determining that the one or more tokens are relevant to describing the first subset of table content; and
  generating a refined index over the one or more tokens and the first subset of table content by modifying the index to include an association between the one or more tokens and the first subset of table content; and
storing the refined index further improving the relevance of providing the one or more subsets of the table in the search results.

10. The method of claim 9, wherein the index improves the relevance of providing part of a web table in the search results.

11. The method of claim 9, further comprising generating the refined index over another subset of table content from the table and one or more of: a page title, a heading, or a uniform resource location (URL).

12. The method of claim 9, further comprising generating the refined index over one or more of:
  a portion of incoming anchor text;
  a portion of content in a click log;
  a portion of content in a knowledge base;
  another subset of table content from the table and a caption derived from a web page; or
  text surrounding the table in a web page.

13. The method of claim 9, wherein the index is an inverted index and wherein the refined index is a refined inverted index.

14. The method of claim 9, wherein accessing the indication that the link to the previously indexed web page was selected by the user comprises accessing a click log including link selection information for a plurality of users.

15. The method of claim 9, wherein accessing the indication that the link to the previously indexed web page was selected by the user comprises accessing a click log including link selection information for a plurality of users.

16. A computer program product comprising one or more computer storage devices having stored thereon computer-executable instructions that, when executed at a processor, cause a computer system to perform the following:
  store an index improving relevance of providing one or more subsets of a table in search results;
  access an indication that a link to a previously indexed web page was selected by a user from among a plurality of links returned in query results responsive to a search query;
  access one or more tokens from at least one of the search query or anchor text in the link; and
  based on the one or more tokens and the indication that the link was selected, refine the index, wherein refining the index comprises:
    selecting a first subset of table content of the table from a plurality of different subsets of table content of the table;
    determining that the one or more tokens are relevant to describing the first subset of table content; and
    generating a refined index over the one or more tokens and the first subset of table content by modifying the index to include an association between the one or more tokens and the first subset of table content; and
  store the refined index further improving the relevance of providing the one or more subsets of the table in the search results.

17. The computer program product of claim 16, wherein the refined index improves the relevance of providing part of a web table in the search results.

18. The computer program product of claim 16, wherein the computer-executable instructions that, when executed, cause the computer system to access the one or more tokens are further configured to cause the computer system to access one or more words in a query.

19. The computer program product of claim 16, wherein accessing the indication that the link to the previously indexed web page was selected by the user comprises accessing a click log including link selection information for a plurality of users.

20. The computer program product of claim 16, wherein accessing the indication that the link to the previously indexed web page was selected by the user comprises accessing a click log including link selection information for a plurality of users.

* * * * *